No. 841,317. PATENTED JAN. 15. 1907.
J. D. & H. F. FLOWERS.
TOBACCO PLANT BED BURNER.
APPLICATION FILED APR. 23, 1906.
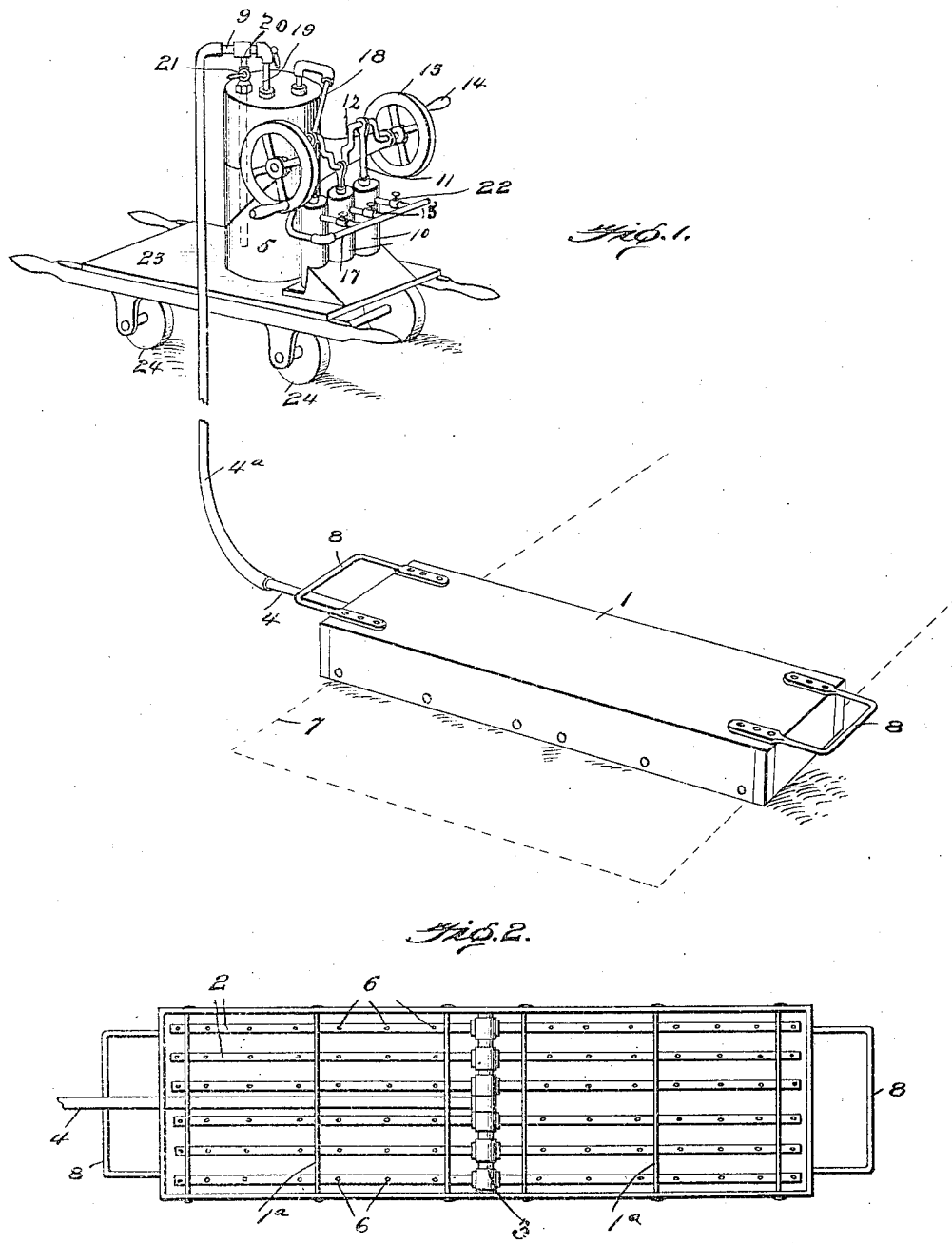

UNITED STATES PATENT OFFICE.

JOHN D. FLOWERS AND HENRY F. FLOWERS, OF ADAIRVILLE, KENTUCKY.

TOBACCO-PLANT-BED BURNER.

No. 841,317.      Specification of Letters Patent.      Patented Jan. 15, 1907.

Application filed April 23, 1906. Serial No. 313,241.

*To all whom it may concern:*

Be it known that we, JOHN D. FLOWERS and HENRY F. FLOWERS, citizens of the United States, and residents of Adairville, county of Logan, and State of Kentucky, have invented certain new and useful Improvements in Tobacco-Plant-Bed Burners, of which the following is a specification.

Our invention relates to apparatus for burning the soil of tobacco-plant beds for the purpose of destroying foreign seeds and other deleterious substances, including certain chemical substances.

Our object is to provide a device of this character which shall be simple and durable in construction, readily portable, and capable of being operated at the minimum cost.

Heretofore it has been the common practice to use wood as a fuel wherewith to burn tobacco-plant beds, which practice, owing to the growing scarcity of wood, is comparatively expensive, a large quantity of wood being needed to treat any considerable acreage, and by our invention we greatly reduce this cost by the improved oil-burning apparatus hereinafter described and claimed, with reference to the accompanying drawings, in which—

Figure 1 is a perspective view showing our improved apparatus applied to a bed; and Fig. 2 is a bottom view of the burner.

Referring to the drawings, in which like parts are indicated by the same reference characters in both views, the numeral 1 designates the burner casing or hood, open on one of its sides, in which is mounted a series of pipes 2, extending longitudinally thereof, and connected with a transverse pipe 3, from which the said pipes 2 extend in opposite directions. Stay-rods 1ᵃ connect the sides of the hood 1 and serve to strengthen the whole structure. The pipe 3 is connected with the oil-supply pipe 4, which is connected by a flexible section 4ᵃ with a branch pipe 9 on the tank 5, through which supply-pipe a mixture of oil and air under pressure passes from the oil-tank 5, said mixture issuing from the pipes 2 through perforations 6 therein in the form of jets, which are ignited and form the heating flames for burning the soil on the bed, (indicated at 7.) The hood or casing 1 is provided with suitable handles 8, by which it may be transported and placed in proper position with its open side downward to direct the flames onto the soil, said burner being moved by said handles from place to place over said bed until the entire surface has been covered.

To furnish a mixture of air and oil under pressure, I provide the oil-tank 5, with which the supply-pipe 4 communicates, through a branch pipe 9, connected to the tank, through an opening in the top thereof and extending downwardly into the said tank to a point near the bottom. Pressure is maintained in the reservoir or tank 5 above the oil therein by means of an air-compressor, consisting in the present instance of an air-pump of any suitable form and of any desired number of cylinders 10, three being shown in the drawings, the pump-rod 11 of each of which cylinders is connected to a crank on a driving-shaft 12, operated by any suitable power, hand-wheels 13, provided with pins 14, being shown as a convenient means for operating the said pump by manual power. The cylinders 10 deliver compressed air through outlet-pipes 15 by branch pipes 17 to a common discharge-pipe 18, opening into the top of the tank 5 above the oil therein, so as to discharge compressed air into the tank above the liquid. This compressed air serves to maintain the required pressure in the oil-tank and also supplies the necessary amount of air for admixture with the oil through the medium of the air-nozzle 19, opening into the tank above the oil therein and communicating with the oil-supply branch pipe 9 through a coupling 20, having a valve 21 therein for regulating the amount of air mixed with the oil issuing from the tank and passing through the oil-supply to the burner. The delivery or discharge pipes 15 have each a check-valve 22 therein, closing against backflow of compressed air, as usual in air-pump structures, and all the parts of the air-compressing and oil-supply apparatus are mounted upon a suitable base or platform 23, provided with handle-bars and mounted on wheels 24, so that the same may be readily portable by hand from place to place as the burner is moved over the plant-bed to be treated, the flexible pipe-section 4ᵃ permitting a certain range of movement of the burner without changing the position of the air-compressing and oil-supply apparatus.

By the use of our apparatus it will be noted that the heat of the flame issuing from the plurality of perforations 6 uniformly distributed will be uniformly directed onto the soil, and thus quickly and effectually destroy the deleterious foreign seeds and other matter.

We are aware that it has been proposed to provide an oil-burning device for use in burning tobacco-plant beds, and while we do not claim such a device broadly we wish it understood that we recognize the fact that changes may be made in the details of our invention as herein described and claimed without departing from the spirit of the invention within the limits of the claim hereto appended, and, therefore,

What we claim, and desire to secure by Letters Patent of the United States, is—

An apparatus for burning tobacco-plant beds, comprising a portable base or platform, an oil-reservoir and air-compressing device thereon, said air-compressing apparatus arranged to deliver compressed air into the reservoir above the oil therein, an oil-outlet pipe communicating with the reservoir through the top and opening near the bottom thereof, an air-outlet pipe connecting the top of the reservoir with said outlet for mixing air with the oil, and an independent oil-burner adapted to be moved over the surface of the soil comprising a hood with an open side, and a series of perforated pipes therein whose perforations are so disposed as to direct flames therefrom upon the soil, and a flexible supply-pipe connecting said perforated pipes with the oil-outlet pipe of the reservoir.

In testimony whereof we have signed our names to this specification in the presence of two subscribing witnesses.

JOHN D. FLOWERS.
HENRY F. FLOWERS.

Witnesses:
TYLER CALHOUN,
FRANK A. SMITH.